United States Patent
Hui et al.

(10) Patent No.: US 6,545,431 B2
(45) Date of Patent: Apr. 8, 2003

(54) DIMMABLE ELECTRONIC BALLAST

(75) Inventors: Ron Shu-yuen Hui, Hong Kong (HK); Henry Shu-hung Chung, Hong Kong (HK); Eric Ho, Hong Kong (HK); Stephen Tsz-sek Lee, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 09/883,151

(22) Filed: Jun. 15, 2001

(65) Prior Publication Data

US 2002/0033679 A1 Mar. 21, 2002

Related U.S. Application Data

(60) Provisional application No. 60/211,575, filed on Jun. 15, 2000.

(51) Int. Cl.[7] .................................................. G05F 1/00
(52) U.S. Cl. ..................... 315/291; 315/209 R; 315/219
(58) Field of Search ............................... 315/219, 224, 315/209 R, 291, 307, 247, 276, 200 R, 210

(56) References Cited

U.S. PATENT DOCUMENTS

| | | | |
|---|---|---|---|
| 4,210,846 A | * 7/1980 | Capewell et al. ........... 315/121 |
| 5,396,155 A | 3/1995 | Bezdon et al. .............. 315/291 |
| 5,559,395 A | * 9/1996 | Venkitasubrahmanian et al. .......................... 315/247 |
| 5,604,411 A | 2/1997 | Venkitasubrahmanian et al. .......................... 315/307 |
| H1644 H | * 5/1997 | Muehl et al. ............... 204/196 |
| 5,636,106 A | 6/1997 | Batarseh et al. ............. 363/16 |
| 5,691,605 A | * 11/1997 | Xia et al. .................... 315/307 |
| 6,100,644 A | * 8/2000 | Titus ...................... 315/209 R |
| 6,144,169 A | * 11/2000 | Janczak ....................... 315/224 |

FOREIGN PATENT DOCUMENTS

FR    78 13809    12/1979    ........... H02M/7/04

OTHER PUBLICATIONS

Janczak et al., "Triac Dimmable Integrated Compact Fluorescent Lamp," *Journal of the Illuminating Engineering Society*, pp. 144–151, Winter 1998.

Ki et al., "Phase–Controlled Dimmable Electronic Ballast for Fluorescent Lamps," *Proc. IEEE Power Electron*, pp. 1121–1124, 1999.

* cited by examiner

*Primary Examiner*—Don Wong
*Assistant Examiner*—Jimmy T. Vu
(74) *Attorney, Agent, or Firm*—Merchant & Gould P.C.

(57) ABSTRACT

This invention relates to dimmable electronic ballasts for particular use with fluorescent lamps.

9 Claims, 8 Drawing Sheets

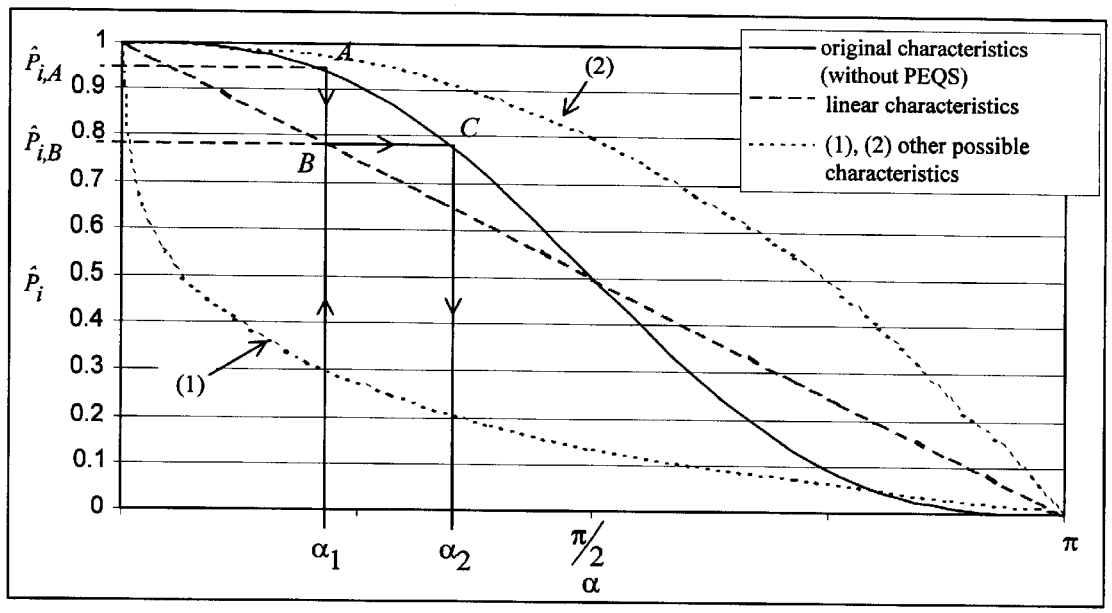
FIG. 3 Relationships between $\hat{P}_i$, and $\alpha$.
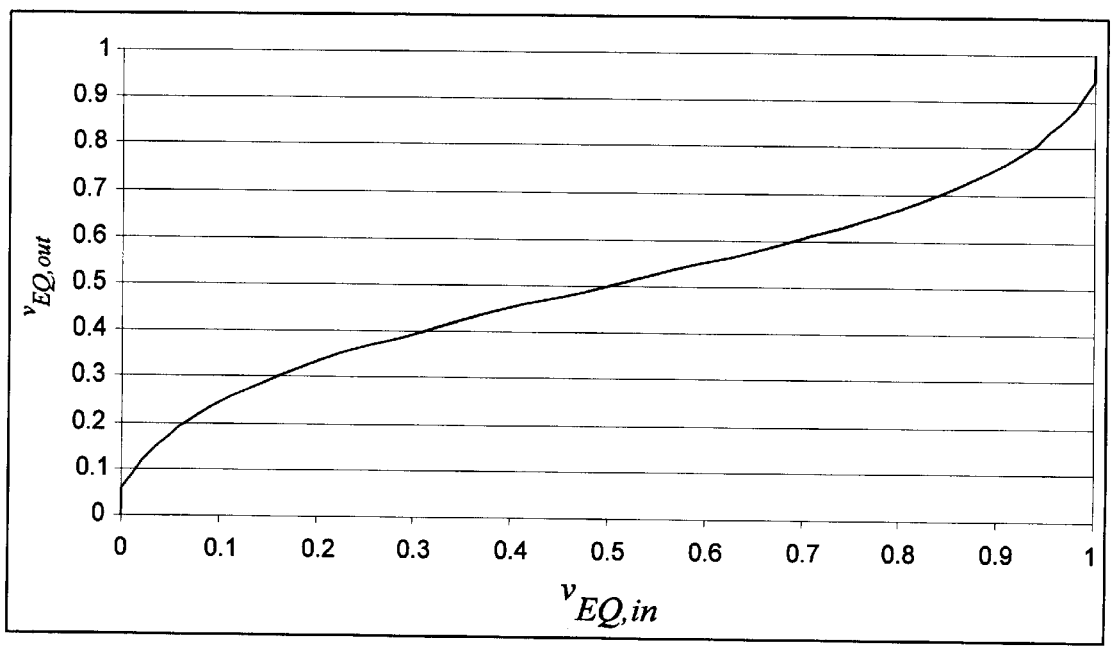
FIG. 4 Relationships between $v_{EQ,in}$ and $v_{EQ,out}$ of the EQC.

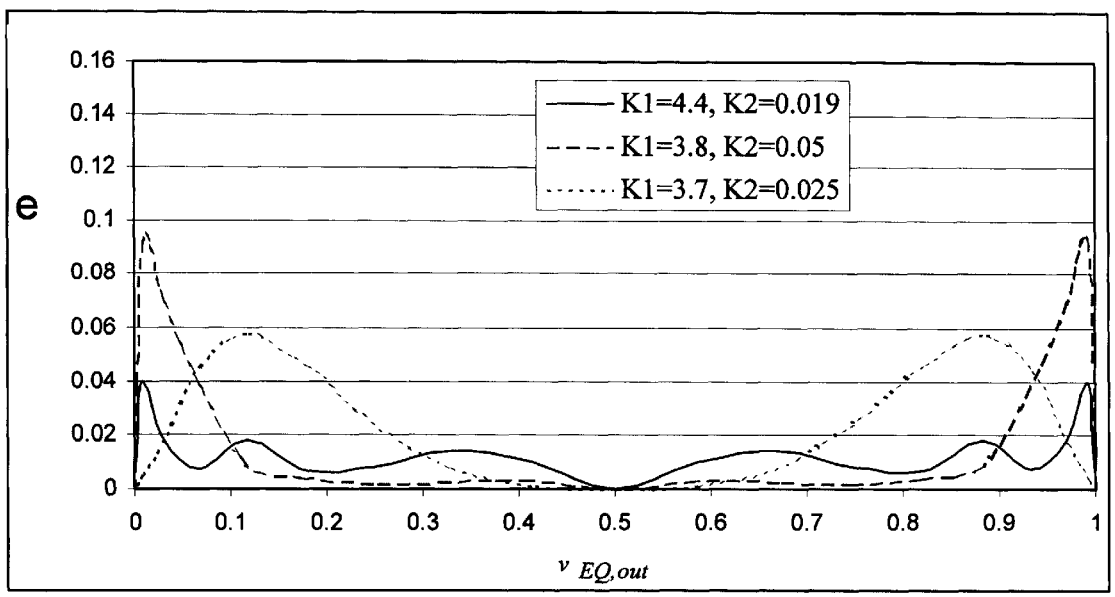
FIG. 5 Error e of $^v E_{Q,out}$ versus $^v E_{Q,out}$ with different values of $K_1$ and $K_2$.

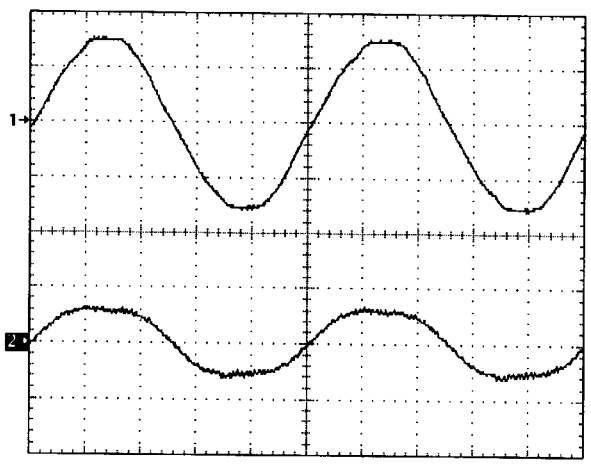
(a) AC mains voltage (Ch1:200V/div) and $i_{ac}$ (Ch2: 500mA/div).
(Timebase: 4ms/div).
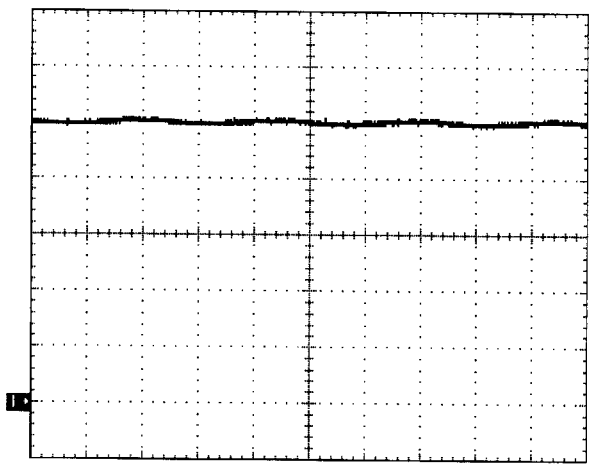
(b) $v_{dc}$ (Ch1:50V/div). (Timebase: 4ms/div).
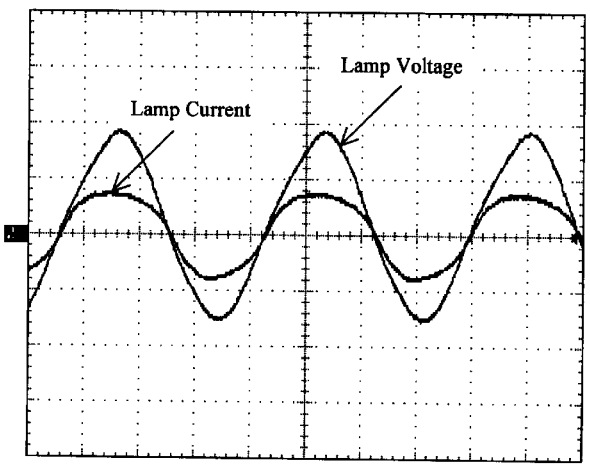
(c) Lamp voltage (Ch:1 100V/div) and Lamp current (Ch 2: 500mA/div).
(Timebase: 2μs/div).
Fig. 6 Experimental Waveforms when $\alpha = 0°$

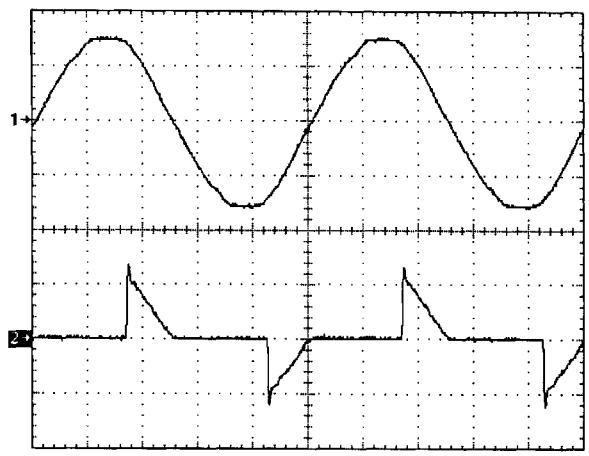
(a) AC mains voltage (Ch1:200V/div) and $i_{ac}$(Ch2: 500mA/div). (Timebase: 4ms/div).
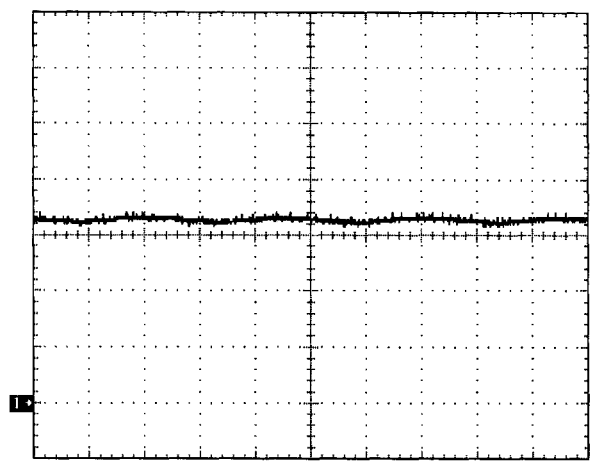
(b) $v_{dc}$(Ch1:50V/div). (Timebase: 4ms/div).
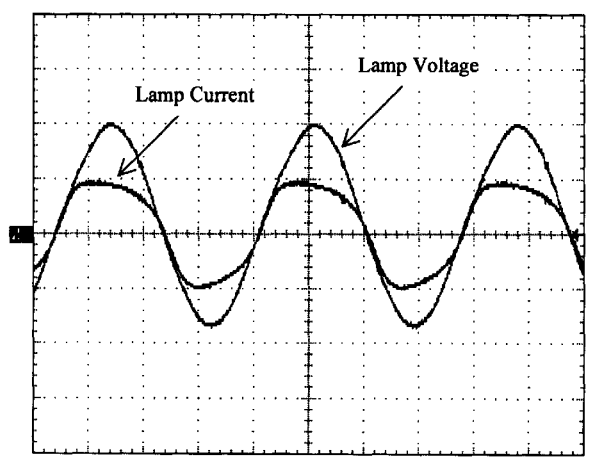
(c) Lamp voltage (Ch:1 100V/div) and Lamp current (Ch 2: 200mA/div). (Timebase: 2µs/div).
Fig. 7 Experimental Waveforms when $\alpha = 60°$

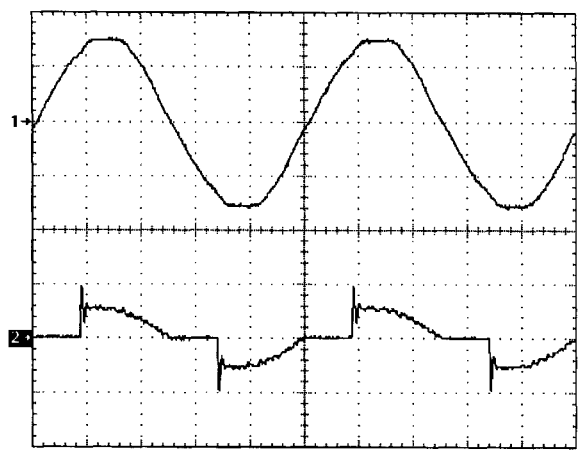
(a) AC mains voltage (Ch1:200V/div) and $i_{ac}$(Ch2: 500mA/div).
(Timebase: 4ms/div).
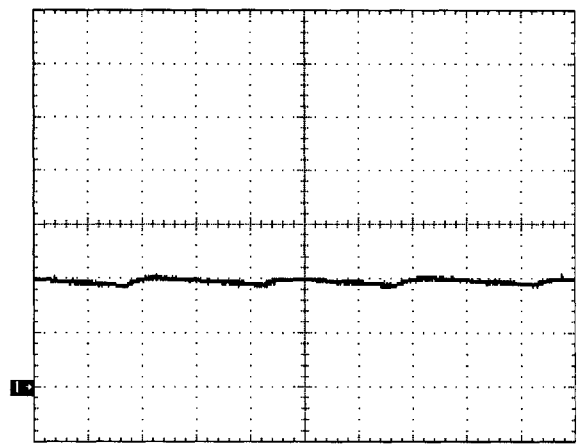
(b) $V_{dc}$(Ch1:50V/div). (Timebase: 4ms/div).
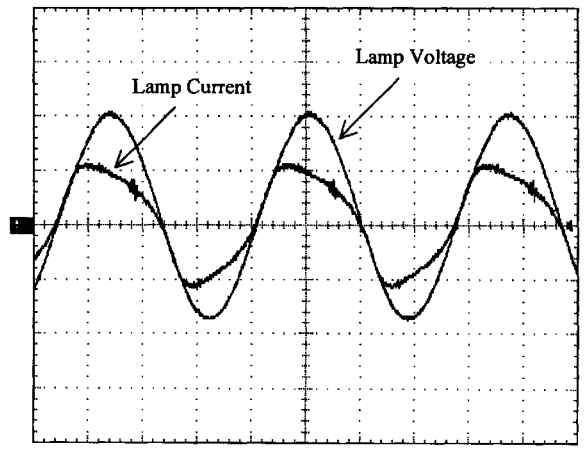
(c) Lamp voltage (Ch:1 100V/div) and Lamp current (Ch 2: 50mA/div).
(Timebase: 2μs/div).
Fig. 8 Experimental Waveforms when $\alpha = 120°$

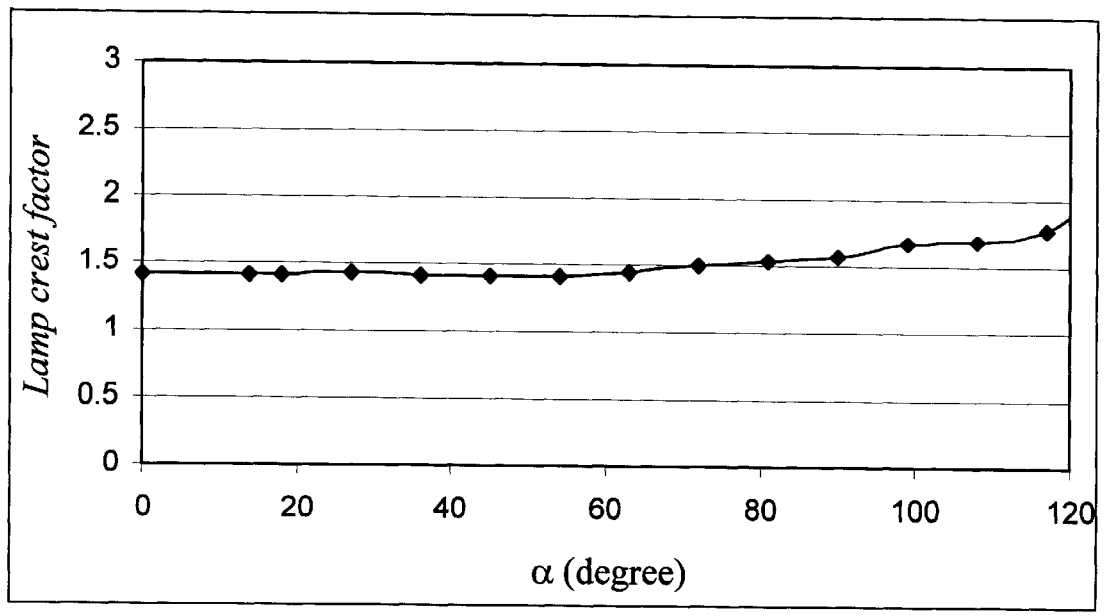
FIG. 9 Measured lamp crest factor versus a.
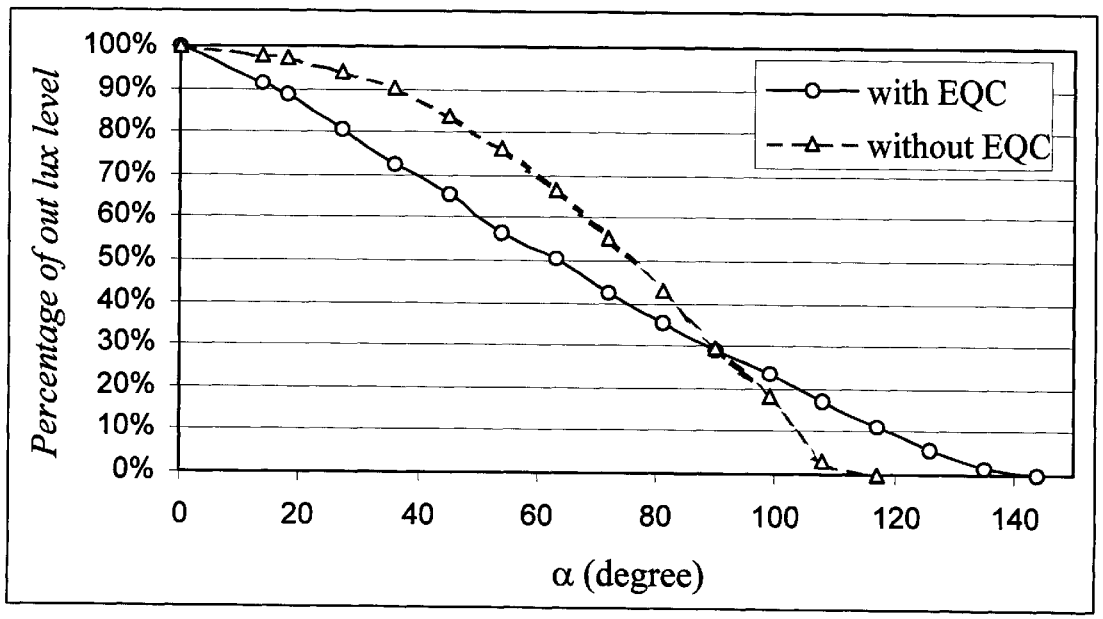
FIG. 10 Measured percentage of output lux level versus a.

DIMMABLE ELECTRONIC BALLAST

This application claims the benefit of U.S. Provisional Application No. 60/211,575 filed Jun. 15, 2000, entitled DIMMABLE ELECTRONIC BALLAST, and which is in its entirety incorporated herewith by reference.

FIELD OF THE INVENTION

This invention relates to dimmable electronic ballasts for particular use with fluorescent lamps.

BACKGROUND OF THE INVENTION

Fluorescent lamps are controlled by an electronic ballast that provides the necessary ignition voltage for the discharge that provides the illumination. Since a minimum voltage must be provided for the ignition to start, providing a means for dimming the voltage is difficult, as simply varying the supply voltage (which would be effective with say a conventional filament light bulb) cannot be used without jeopardising the ignition voltage.

Notwithstanding this difficulty providing a dimmable ballast is desirable for a number of reasons, including the desire of energy efficiency, and the desire to create a pleasant working environment. A range of techniques have been developed to enable a dimmable fluorescent lamp to be created. For example dimming may be provided by controlling the switching frequency so that the impedance of the limiting inductor in the ballast can be varied so as to control the current into the lamp. Another way of providing dimming control is to control the duty-cycle of the switching devices (switching at constant frequency) so that the average applied voltage and current in the lamp can be varied.

Moreover, of particular importance in the design of electronic ballasts are the requirements for high power factor, low total harmonic distortion, low electromagnetic interference (EMI), low lamp current crest factor, and low flickering. In order to comply with the requirements of certain international standard (for example IEC1000-3-2 Class C appliances), commercially available products usually consist of two cascaded stages for the input power factor correction (PFC) and output high-frequency inversion. A regulated dc voltage, for example 400V, inter-links the two stages. Some specialized integrated circuits have been developed for this particular application to simplify the circuit schematics. For the input stage, boost- and flyback-type pre-regulators are the most popular choices. For the output stage, either a voltage-fed or current-fed inverter is usually chosen. A resonant tank circuit is used because of its distinct advantages of near-sinusoidal lamp current and high voltage generation during the ignition period. The dimming operation is based on adjusting the switching frequency of the inverter so that the reactance of the series inductor can be varied and thus the lamp power can be controlled.

In order to simplify the overall circuitry and reduce the manufacturing cost, many passive PFC circuits and single-stage electronic ballasts with dimming features have recently been reported. Some of them minimize the circuit structure by integrating the switch in the PFC into one of the switches in the inverter. However, their structural elegance is offset by various problems, such as high lamp current crest factor, asymmetrical lamp voltage and current waveforms, high dc link voltage at low luminous level, high component stresses, and narrow dimming range. In order to achieve a desired dimming range and soft-switching of the switches in the inverter, the switching frequency of the inverter has to be varied in a single-stage system. This can result in lamp current and voltage waveform distortion. The dc link voltage has to be set to a much higher value, which can be two to three times higher than the rated value of the supply voltage for reducing the above problem. This aspect is particularly problematic for countries having high-voltage mains supply, such as 220V in Hong Kong and the UK, resulting in the requirement for a very high voltage dc link capacitor for stabilizing the inverter input.

Furthermore, existing dimmable ballasts are generally four-wire systems—two (conventional live and neutral) for the ac supply mains input and the other two connecting to a variable dc voltage input (for example 0–10V) or variable resistor for dimming control. Recently, a ballast that can provide a dimming features using a TRIAC-based dimmer at the supply mains has been proposed in "Phase-controlled dimmable electronic ballast for fluorescent lamps" of W. Ki, J. Shi, E. Yau, P. Mok, and J. Sin, in Proc. IEEE Power Electron Spec. conf. 1999 pp1121–1124. However, the dimmer has to be modified so that the actual firing angle is varied within few degrees of angle only. It has been proposed in "TRIAC dimmable integrated compact fluorescent lamp" of J. Janczak in J. of Illuminating Eng. Soc., pp144–151 1998 to use an ordinary dimmer to adjust the luminous level of compact fluorescent lamps. The dc link voltage is kept at a relatively constant value throughout the dimming range. Again, changing the switching frequency of the inverter varies the output luminous level, and the dimming range is relatively narrow.

Despite the various proposals discussed, there exists a need for a simple yet effective electronic ballast overcoming the drawbacks discussed.

SUMMARY OF THE INVENTION

In one aspect the invention provides an electronic ballast comprising:
  limiting means for receiving, in use, an alternating current and providing user adjustment of the angular range of switch-on in each alternating current cycle;
  an ac-dc rectifier receiving said user-limited alternating current and outputting a dc;
  a dc-dc power converter adapted to provide voltage step up or step down of said rectified dc and to provide power factor correction; and
  an inverter operated at constant frequency to convert the output of the power converter a high frequency alternating voltage.

The limiting means is preferably a TRIAC, allowing user-adjustment of the firing angle over a wide range. The ac-dc rectifier may be a simple full-wave diode bridge rectifier. A filter is provided in order to remove unwanted high frequency noise from the dc-dc power conversion.

The converter may take a variety of forms, for example, a flyback converter, operated in discontinuous conduction mode, in order to ensure that the filtered input current profile is phase-coincident with the TRIAC—controlled voltage waveform. A converter control circuit provides pulse width modulation of the converter duty cycle whilst maintaining constant switching frequency.

In a further aspect of the invention, the dc-dc power converter is adapted to provide power factor correction and to effect voltage step up or down of said rectified dc signal in dependence on the magnitude of the rectified voltage according to a predefined algorithm or equation.

The said predefined algorithm or equation is arranged to effect a mapping between the ballast output power and the firing angle of the TRIAC. This mapping may be a linear relationship but could take other forms.

For example, the mapping may be realised by a linear relationship effected by stepping up or down the dc voltage according to the following function:

$$v^*_{EQ,out} = \frac{1}{2}\left(1 + \frac{1}{K_1}\ln\frac{K_2 + v_{EQ,in}}{1 + K_2 - v_{EQ,in}}\right)$$

where $v^-_{EQ,out}$ is an approximated value of the required voltage after mapping.

$v_{EQ,in}$ is the average input voltage of the rectified TRIAC controlled voltage and k, $k_2$ are constants affecting the accuracy of the approximation.

A variety of means of realising the mapping can be utilised, including an analogue circuit, or an active microprocessor providing real-time or near real-time computation, or a memory mapping technique wherein there are stored values of output voltages corresponding to input voltages.

BRIEF DESCRIPTION OF THE DRAWINGS

Embodiments of the invention are now described, by way of example only, with reference to the following drawings in which:

FIG. 3 is a graph of average power $\hat{P}_l$ against TRIAC firing angle ($\alpha$);

FIG. 4 shows the relationship between input $v_{EQ,in}$ and output $v_{EQ,out}$ of the equalization circuit;

FIG. 5 shows the error $\epsilon$ in approximated voltage output for different values of constants $k_1$ and $k_2$;

FIG. 6(a) shows the measured ac mains voltage and current, (b) shows the measured input voltage driving the inverter; and (c) shows the measured lamp voltage and current; all for $\alpha=0$.

FIG. 7(a) shows the measured ac mains voltage and current, (b) shows the measured input voltage driving the inverter; and (c) shows the measured lamp voltage and current; all for $\alpha=60°$.

FIG. 8(a) shows the measured ac mains voltage and current, (b) shows the measured input voltage driving the inverter; and (c) shows the measured lamp voltage and current; all for $\alpha=120°$.

FIG. 9 shows the variation of measured lamp crest factor with TRIAC firing angle $\alpha$; and FIG. 10 shows the variation of measured lamp lux level with TRIAC firing angle $\alpha$.

DETAILED DESCRIPTION OF THE PREFERRED EMBODIMENTS

Figure 1A:
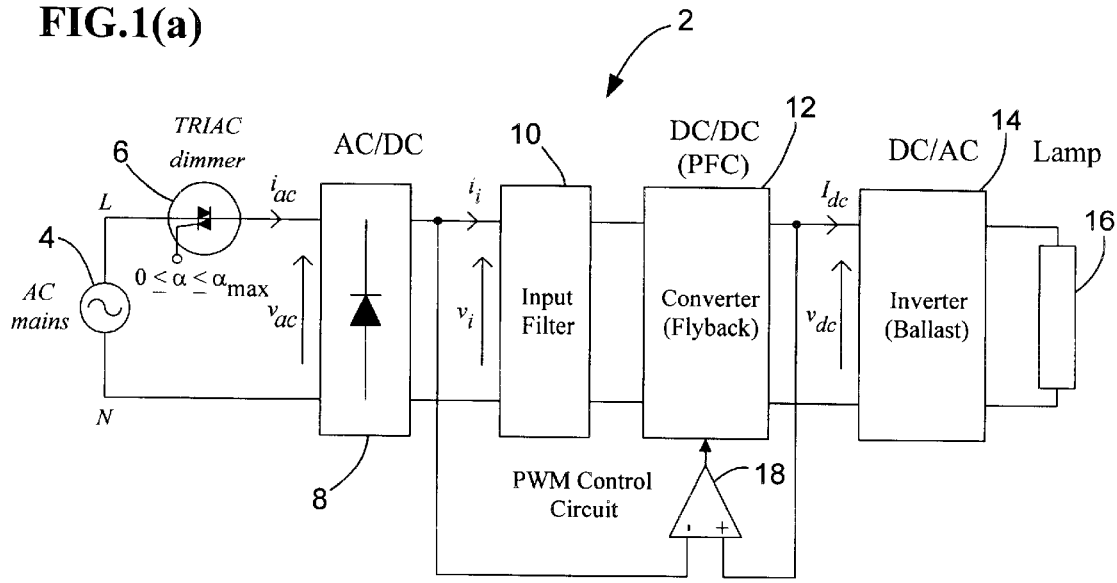
FIG. 1(a) is a circuit block diagram of a dimmable electronic ballast in accordance with a first aspect of the invention.

A circuit 2 providing a dimmable electronic ballast in accordance with a first embodiment of the invention is illustrated in FIGS. 1(a) and (b).

The ballast circuit 2 is connected to an alternating mains supply 4 which will typically be 220 v, 50 Hz or 110 v, 60 Hz The circuit is based around use of a TRIAC dimmer 6 which serves to provide a user-variable firing angle 2 which can be varied between 0 and $\alpha$ max, typically up to about 165°. This user-adjustment of firing angle $\alpha$ is used to provide adjustment of the ballast output voltage in the manner as described below. An ac/dc rectifier 8 converts the TRIAC-controlled sinusoidal voltage to dc. This is filtered at input fitter 10 to remove unwanted high frequency noise components, and the filtered signal fed to a dc-dc power converter 12, such as a flyback converter to provide power factor conversion, outputting a dc voltage which is a function of the TRIAC firing angle $\alpha$. The dc voltage drives an inverter (ballast) 14 which in turn drives the fluorescent tube 16. Pulse width modulation control circuit 18 drives the dc-dc power converter 12.

Figure 1B:
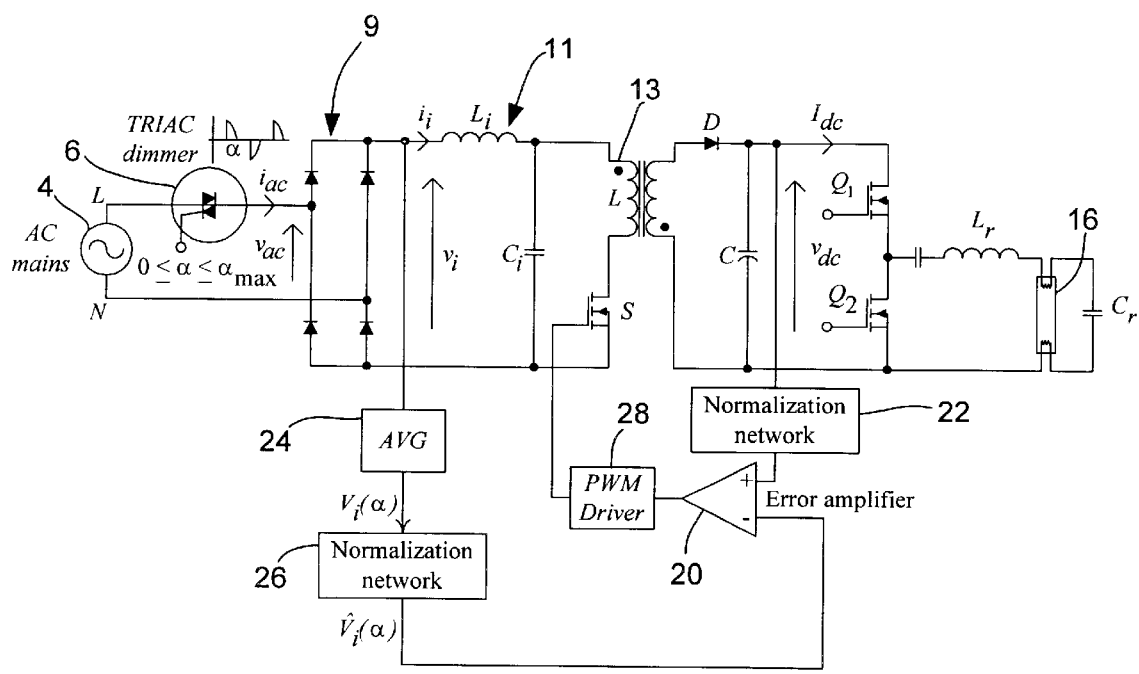
FIG. 1(b) is a circuit schematic of the dimmable electronic ballast of FIG. 1(a)

Turning more specifically to FIG. 1(b), the ac/dc rectifier 8 can be one of wide variety of possible devices, but a simple full-wave diode bridge rectifier 9 is appropriate. Input filter 10 can take a variety of forms, but a simple LC filter 11 can be employed, comprising inductor $L_i$ and capacitor $C_2$. The dc-dc power converter may be a flyback converter; however, a variety of other power converters can be utilised such as a buck-boost converter, Cuk converter, or SEPIC converter. The flyback converter 13 is driven in a discontinuous conduction mode at constant switching frequency of MOSFET switch S through pulse width modulation driver 28 which serves to vary the duty cycle to thereby control the output voltage $v_{dc}$.

The control of the flyback converter 13 is effected through error or quotient amplifier 20, which compares the voltage driving the inverter $v_{dc}$ (subject to normalisation by means of normalization network 22, such as a simple R network or potentiometer) with the input voltage $v_i$ (subject to averaging through an averaging circuit 24 such as a simple RC network, followed by normalisation in normalisation network 26). Thus, the flyback converter 13 provides either voltage step up or step down. The flyback converter 13 also effects power factor conversion. The operation of the converter 13 in discontinuous conduction mode results in the filtered input current profile $i_i$ following closely the TRIAC controlled voltage waveform. The power factor (defined as the product of displacement of voltage from the current, and the distortion factor) can be close to unity, typically in 0.98–0.99.

The inverter 14 is a conventional half-bridge series-resonant parallel-loaded inverter comprising a pair of MOSFET switches $Q_1$ and $Q_2$ driven to provide an alternating voltage for driving the tube 16.

The flyback converter 13 thus provides a dc voltage of low ripple voltage for ensuring low current crest factor on the fluorescent lamp. It has been found that the average input current of the half-bridge inverter is relatively constant, when the inverter is operating at a constant switching frequency and supplying power to a fluorescent lamp. Controlling the dc link voltage $v_{dc}$ can be used to directly adjust the output power of the lamp. With the duty cycle of the switch S kept constant, and the firing angle $\alpha$ of the TRIAC adjusted, the input voltage $v_1$ of the flyback converter will be varied accordingly and hence $v_{dc}$ and the output lamp power will also be varied.

In a further aspect, the invention provides a means of transforming the lamp power as a function of TRIAC firing angle.

The input power $P_i$ of the ballast can be expressed as $$P_i(\alpha) = \frac{\tilde{v}_i^2(\alpha)}{R_i} \quad (1)$$

$$= \frac{1}{\pi R_i} \int_x^\pi V_m^2 \sin^2\omega t \, d\omega t$$

$$= \frac{V_m^2}{2\pi R_i}\left[(\pi - \alpha) + \frac{\sin 2\alpha}{2}\right]$$

where $v_i$ is the rms value of $v_i$, $V_m$ and $\omega$ are the peak value and the angular frequency of the ac mains, and $R_i$ is the input resistance of the flyback converter. If $P_i$ is normalized by the input power at $\alpha=0°$, its normalized value $\hat{P}_i(\alpha)$ is $$\hat{P}_i = \frac{1}{\pi}\left[(\pi - \alpha) + \frac{\sin 2\alpha}{2}\right] \quad (2)$$

FIG. 3 shows the relationships between $\hat{P}_i$ and $\alpha$. $\hat{P}_i$ varies from 1 to 0 as $\alpha$ increases from 0 to $\pi$ radians. Due to the nonlinear characteristics, the output lamp power is sensitive to the variation of $\alpha$ at the middle of the control range and is less sensitive at the two extremes (i.e., around 0 and $\pi$ radians). For example, $\hat{P}_i$ has diminished into 0.2 when $\alpha$ equals $2\pi/3$ radians (67% of the control range). In addition, the useful angular control range is restricted because the lamp might extinguish at a lower value of $\alpha$ than the one with linear characteristics. In order to map the $\hat{P}_i$-$\alpha$ characteristics into a desired one and increase the controllable range, a power equalization scheme (PEQS) is proposed. As shown in FIG. 2(b), the scheme is based on using the average value of $v_i$ (i.e., $v_i$) to derive the required $v_{dc}$.

A particular example of a $\hat{P}_i$-$\alpha$ characteristic curve in the form of a linear relationship is depicted in FIG. 3 (other possible non-linear characteristics are shown by lines (1) and (2) in FIG. 3). Mathematically, $$\hat{P}_i = -\frac{1}{\pi}\alpha + 1 \quad (3)$$

If this linearization can be achieved, $\alpha$ increases from $(2\pi/3)$ to $0.8\pi$ radians (i.e., 144°—about 80% of the control range) before $\hat{P}_i$ reaches 0.2 (this being a typical threshold for extinction). Therefore, the lamp stays illuminated over a wider angular range, resulting in a high angular control range for the dimmable lighting system, and hence wide range of output power. In addition, the output power of the lamp has the same control sensitivity throughout the operating range. $V_i(\alpha)$ is equal to $$V_i(\alpha) = \frac{1}{\pi}\int_x^\pi V_m \sin\omega t \, d\omega t \quad (4)$$

$$= \frac{V_m}{\pi}(1 + \cos\alpha)$$

If $V_i$ is normalized by its value at $\alpha=0$, its normalized value $\hat{V}_i(\alpha)$ is equal to $$\hat{V}_i(\alpha) = \frac{1}{2}(1 + \cos\alpha) \quad (5)$$

Consider a generic firing angle $\alpha_1$, the power is $\hat{P}_{i,A}$ in the original characteristics. Its operating point is at point 'A' in FIG. 3. For example, in order to achieve a linear relationship between $\hat{P}_i$ and $\alpha$, an output power of $\hat{P}_{i,B}$ at $\alpha_1$ should be equalized (i.e., at the point 'B'). Thus, $v_{dc}$ has to be equal to a value such that the power is equal to $\hat{P}_{i,B}$. Thus, by mapping $\hat{P}_{i,B}$ into the original characteristics, the required firing angle is $\alpha_2$ (i.e., at point 'C'). Mathematically, $$\cdot \hat{P}_{1B} = -\frac{1}{\pi}\alpha_1 + 1 = \frac{1}{\pi}\left[(\pi - \alpha_2) + \frac{\sin 2\alpha_2}{2}\right] \quad (6)$$

This gives the required mapping $$\alpha_1 = \alpha_2 - \frac{\sin 2\alpha_2}{2} \quad (7)$$

Figure 2A:
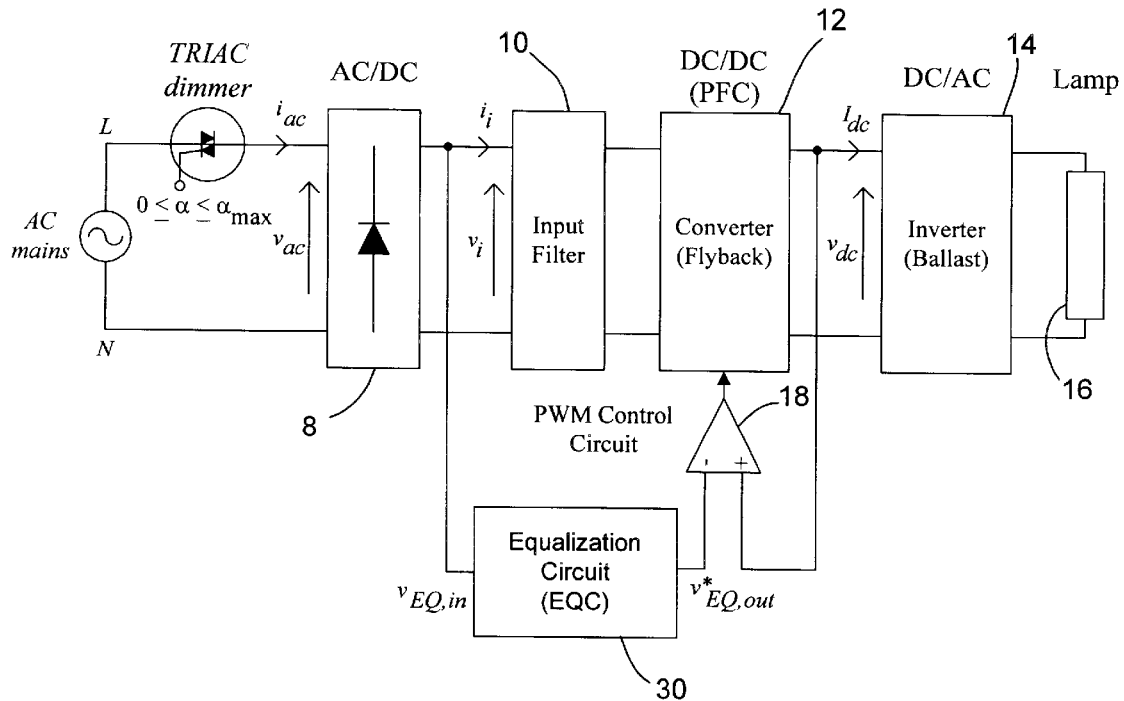
FIG. 2(a) is a circuit block diagram of a dimmable electronic ballast with equalization in accordance with a second aspect of the invention.
Figure 2B:
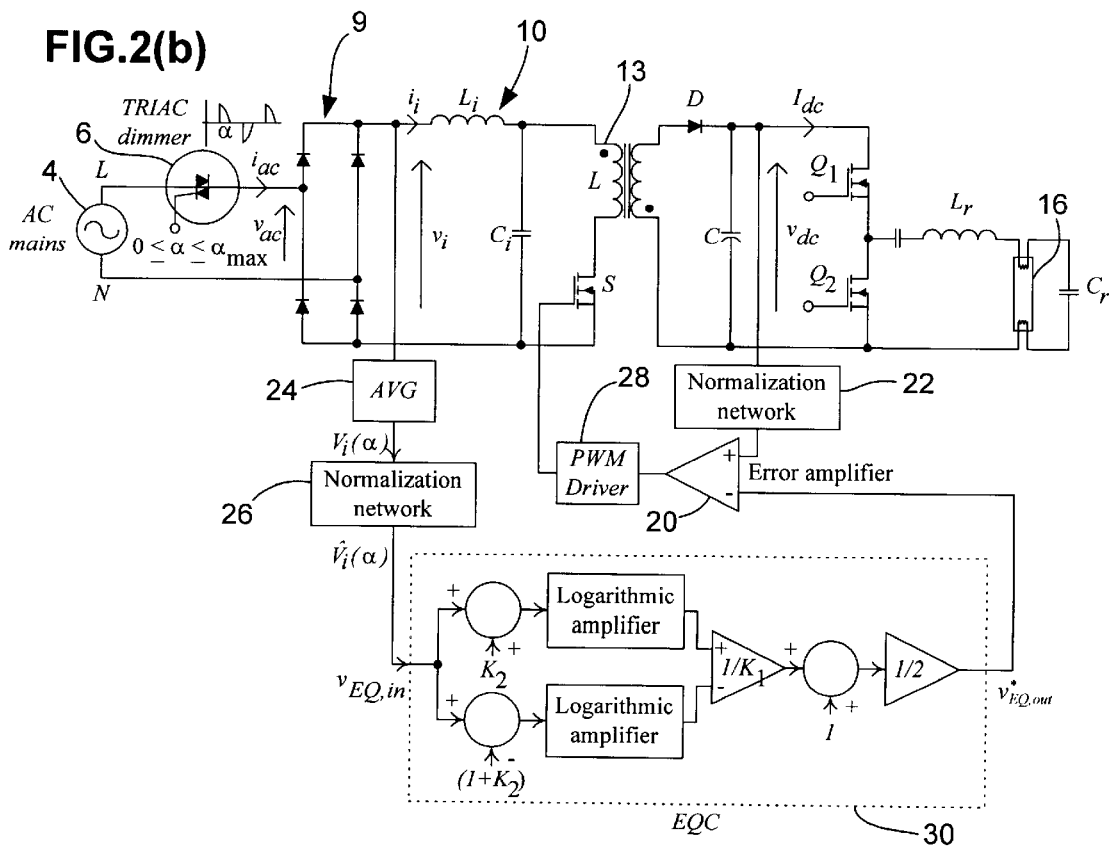
FIG. 2(b) is a circuit schematic of the dimmable electronic ballast of FIG. 2(a).

As shown in FIGS. 2(a) and (b), an equalization circuit (EQC) is designed to implement the above mapping, as discussed further below. With the input $v_{EQ,in}$ equal to $\hat{V}_i(\alpha_1)$, the EQC will generate an output $v_{EQ,out}$ equal to $$\frac{1}{2}(1 + \cos\alpha_2).$$

The relationship between $v_{EQ,in}$ and $v_{EQ,out}$ is shown in FIG. 4.

A simple way to implement the mapping is to use to relationship of $\cos(\alpha_1)$ and $\cos(\alpha_2)$ because $\cos(\alpha)$ can be derived from the measurement of $\hat{V}_i(\alpha)$ as indicated in (5). This relationship can be expressed as:

$$\cos(\alpha_2) = \frac{1}{k_1}\ln\left[\frac{m + \cos(\alpha_1)}{m - \cos(\alpha_1)}\right] \quad (8)$$

where $k_1$ and $m$ are constants.

If the average input voltage is $v_{EQin}$, from (5), $$\cos(\alpha_1) = 2v_{EQin} - 1 \quad (9)$$

Putting (9) into (8), $$\cos(\alpha_2) = \frac{1}{k_1}\ln\left[\frac{k_2 + v_{EQin}}{1 + k_2 - v_{EQin}}\right] \quad (10)$$

where $$k_2 = \frac{m-1}{2}$$

is a constant.

Using the mapping and using (5), the required voltage after linearization is $$v_{EQout} = \frac{1}{2}(1 + \cos\alpha_2) \quad (11)$$

From (10) and (11), the mapping in FIG. 4 can be realized by the following sigmoid function. The approximated value of $v_{EQ,out}$, denoted by $v_{EQ,out}^*$, is equal to $$v_{EQ,out}^* = \frac{1}{2}\left(1 + \frac{1}{K_1}\ln\frac{K_2 + v_{EQ,in}}{1 + K_2 - v_{EQ,in}}\right) \quad (12)$$

where $k_1$ and $k_2$ are constants that affect the accuracy of the approximation.

It will be appreciated that the mapping represents a voltage step down for angles $$0 < \alpha < \frac{\pi}{2},$$

and a voltage step up for angles $$\frac{\pi}{2} < \alpha < \pi.$$

FIG. 5 shows the error $\epsilon$ of (12) against $v_{EQ,out}$ under different values of $k_1$ and $k_2$. $\epsilon$ is defined as $$\epsilon = |v_{EQ,out} - v_{EQ,out}| \quad (13)$$

As shown in FIG. 4 and FIG. 5, the conversion between $v_{EQ,in}$ and $v_{EQ,out}$ is sensitive only at the two extremes (i.e., around 0 and 1). However, it can be shown by the measurement (FIG. 10) that this feature does not have any major adverse affect on the luminous output.

FIG. 2(a) shows the circuit for effecting transformation in block diagram form where components identical to the circuit of FIGS. 1(a) and (b) are illustrated with like numerals. The equalization circuit 30 is indicated in FIG. 2(a) as effecting the above-discussed voltage mapping, the control circuit controlling the flyback converter in reliance on the difference between the output voltage $v_{dc}$, and the demand voltage subject to its mapping. More specifically, as indicated in FIG. 2(b), the voltage $v_i$ at the input of the filter 10, 11 is averaged to give $V_1$ at averaging filter 24, and normalised by network 26. Equalisation circuit 30 is shown schematically as providing the mapping represented by equation (12) above. In practice the equalisation circuit can be realised by a variety of means including an analogue circuit as suggested, a memory mapping functional circuit which stores values of input and output voltages for example in look-up tables, or a digital microcontroller or microprocessor to provide real-time mapping according to a stored algorithm. The mapped demand voltage $v_{EQ,out}$ is compared with $v_{dc}$ (subject to normalisation) in error amplifier 20, the output driving MOSFET switch S by means of pulse width modulation driver 28, as in the first embodiment.

The constants $k_1$ and $k_2$ are preferably derived by a computational optimization technique involving a consideration of $\epsilon$ in (equation (3)) for a variety of $v_{EQ,out}$. The method yields $k \cong 4.4$ and $k_2 = 0.019$ as a useful approximation. Further refinements to $k_1$ and $k_2$ can be effected by experimental techniques if required.

An experimental prototype for a 40 W tubular fluorescent lamp was tested. The ac mains supply was 220V, 50 Hz. The circuit of FIG. 2(b) was utilised, the specifications and the component values as used tabulated in Table I. The constants $K_1$ and $K_2$ were chosen to be 4.4 and 0.019, respectively. FIG. 6 to FIG. 8 show the experimental waveforms for $\alpha = 0°$, 60°, and 120°, respectively. $i_{ac}$ is in the same profile as the ac mains. Moreover, the ripple voltage on $v_{dc}$ is 8V at $\alpha = 0°$, 10V at $\alpha = 60°$, and 12V at $\alpha = 120°$, which are all at the acceptable levels. FIG. 9 shows the measured lamp current crest factors versus $\alpha$. It can be seen that the crest factor (generally regard as needing to stay below 1.7, whilst anything less than 1.4 is considered excellent) is very low at small $\alpha$ and increases with $\alpha$. For $\alpha$ less than 90°, the crest factor is less than 1.5. For $90° < \alpha < 110°$, the crest factor is less than 1.7. The increase of the crest factor is mainly because the time duration during which the TRIAC is non-conducting and the dc link capacitor supplies to the inverter increases as $\alpha$ increases. In addition, the unsymmetrical current flow in the TRIAC becomes more significant at larger firing angle, due to the different quadrant of operation. Hence, the dc link voltage ripple will then be increased.

TABLE I

Specifications and component values of the prototype.

| Specifications | | | |
|---|---|---|---|
| Mains Supply | 220 V, 50 Hz | | |
| TRIAC dimmer | "CLIPSAL" Dimmer 500 VA, 250 V | | |
| Fluorescent Lamp | "National" FL40SD 40 W | | |
| Component values | | | |
| A. Input Filter | | | |
| $L_I$ | 1.6 mH | $C_i$ | 0.1 uF |
| B. Flyback Converter | | | |
| Switching frequency | 100 kHz | L | 100 uH |
| $\Delta v_{out,max}$ | 15 V | C | 220 uF |
| S | RFP4N100 | $\alpha_{max}$ | 135° |
| C. Inverter | | | |
| Switching frequency | 135 kHz | $L_r$ | 360 uH |
| $\Omega$ | IRF840 | $C_r$ | 4700 pF |

FIG. 10 shows the measured percentage output lux level of the fluorescent lamp with respect to $\alpha$ with the EQC incorporated and excluded. Moreover, the output lux level changes from a nonlinear relationship to a linear one with the EQC included. The controllable range is also widened, demonstrating the applicability of the technique.

An electronic ballast which is able to provide effective dimming control of a fluorescent lube (either of tubular or compact type) is provided by the described circuits. A circuit which is able to provide a substantially transformed dimming control over a particularly wide range is provided. It is found that this linearised circuit reduces the flickering and dark ring effects in the low dimming and low power regions of operation, which is advantageous for the lifetime of a fluorescent lamp.

What is claimed is:

1. An electronic ballast comprising:
    (a) limiting means for receiving a user-limited alternating current and providing user adjustment of the angular range of switch-on in each alternating current cycle;
    (b) an ac-dc rectifier receiving said user-limited alternating current and outputting a dc;
    (c) a dc-dc power converter adapted to provide voltage step up or step down of said rectified dc and to provide power factor correction; and
    (d) an inverter operated at constant frequency to convert the output of the power converter to a high frequency alternating voltage;
    wherein means are provided associated with said converter for mapping the input voltage of said converter to the output voltage in accordance with a desired relationship.

2. The electronic ballast as claimed in claim 1 wherein said limiting means comprises a TRIAC.

3. The electronic ballast as claimed in claim 1 wherein said converter comprises a flyback converter, a buck-boost converter, a Cuk converter or a SEPIC converter.

4. The electronic ballast as claimed in claim 1 wherein said mapping is a linear mapping.

5. The electronic ballast as claimed in claim 4 wherein said mapping is performed by an analogue voltage equalisation circuit.

6. The electronic ballast as claimed in claim 5 wherein said circuit implements the equation:

$$v^*_{EQ,out} = \frac{1}{2}\left(1 + \frac{1}{K_1}\ln\frac{K_2 + v_{EQ,in}}{1 + K_2 - v_{EQ,in}}\right)$$

where $v^-_{EQ,out}$ is an approximated value of the required voltage after mapping $v_{EQ,in}$ is the average input voltage of the rectified voltage and $k$, $k_2$ are constants affecting the accuracy of the approximation.

7. An electronic ballast as claimed in claim 4 wherein said mapping is implemented by means of a memory table that stores desired output voltage corresponding to input voltages.

8. The electronic ballast as claimed in claim 4 wherein said mapping is performed by a digital microprocessor.

9. An electronic ballast comprising:

(a) limiting means for receiving a user-limited alternating current and providing user adjustment of the angular range of switch-on in each alternating current cycle;

(b) an ac-dc rectifier receiving said user-limited alternating current and outputting a dc;

(c) a dc-dc power converter adapted to provide voltage step up or step down of said rectified dc and to provide power factor correction; and (d) an inverter operated at constant frequency to convert the output of the power converter to a high frequency alternating voltage; and wherein said converter is selected from the group consisting of a flyback converter, a buck-boost converter, a Cuk converter and a SEPIC converter.

* * * * *